US007894725B2

(12) United States Patent
Holman et al.

(10) Patent No.: US 7,894,725 B2
(45) Date of Patent: Feb. 22, 2011

(54) TIME-MULTIPLEXED OPTICAL WAVEFORM GENERATION

(75) Inventors: Kevin W. Holman, Wilmington, MA (US); David G. Kocher, Lexington, MA (US); Jae H. Kyung, Arlington, MA (US); Leaf A. Jiang, Arlington, MA (US); Sumanth Kaushik, Belmont, MA (US); Richard M. Heinrichs, Framingham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 634 days.

(21) Appl. No.: 11/863,761

(22) Filed: Sep. 28, 2007

(65) Prior Publication Data

US 2009/0087186 A1    Apr. 2, 2009

(51) Int. Cl.
*H04B 10/12* (2006.01)
(52) U.S. Cl. .................. 398/201; 398/183; 398/189; 398/192; 398/199
(58) Field of Classification Search ............ 398/52, 398/53, 74, 75, 101, 102, 182, 183, 189, 398/193, 199, 192, 201; 385/15, 147
See application file for complete search history.

(56) References Cited

U.S. PATENT DOCUMENTS

| | | | | |
|---|---|---|---|---|
| 6,150,976 | A * | 11/2000 | Cooley | 342/169 |
| 6,195,484 | B1 | 2/2001 | Brennan, III et al. | |
| 6,671,298 | B1 | 12/2003 | Delfyett et al. | |
| 6,711,313 | B2 * | 3/2004 | Takiguchi et al. | 385/15 |
| 6,724,783 | B2 | 4/2004 | Jalai et al. | |
| 6,972,887 | B2 | 12/2005 | Wickham et al. | |

(Continued)

FOREIGN PATENT DOCUMENTS

GB    2384127    7/2003

(Continued)

OTHER PUBLICATIONS

Takiguchi et al: "Flexible pulse waveform generation using silica-waveguide-based spectrum synthesis circuit", Electronics Letters, vol. 40, No. 9, Apr. 29, 2004, pp. 1-2.*

(Continued)

*Primary Examiner*—Li Liu
(74) *Attorney, Agent, or Firm*—Gauthier & Connors LLP

(57) ABSTRACT

A time-multiplexed waveform generator includes a wavelength splitter that receives an input optical signal and spectrally separates the input optical signal into a plurality of frequency components. A plurality of intensity modulators receives each of the frequency components and passes each of the frequency components for a selective time period, and then extinguishes that frequency for the remainder of a chirp time, the plurality of intensity modulators producing a plurality of first output signals. A plurality of adjustable delay lines is positioned after the intensity modulators and receives the first output signals. Each of the adjustable delay lines enables phase control of each of the frequency components associated with the first output signals for compensating any relative drifts of the path lengths and phase coherently stitching a plurality of sub-chirps together. The adjustable delay lines produce a plurality of second output signals. A wavelength combiner receives the second output signals and recombines the output signals to produce a stair-step waveform output signal.

18 Claims, 2 Drawing Sheets

U.S. PATENT DOCUMENTS

| | | | |
|---|---|---|---|
| 7,085,499 | B2 | 8/2006 | Yap et al. |
| 7,142,789 | B1* | 11/2006 | Weiner et al. ............... 398/201 |
| 7,145,713 | B2 | 12/2006 | Chang et al. |
| 7,277,617 | B2 | 10/2007 | Bhowmik |
| 2005/0163460 | A1* | 7/2005 | Merkel et al. ............... 385/147 |
| 2006/0187537 | A1 | 8/2006 | Huber et al. |
| 2007/0104451 | A1* | 5/2007 | Handelman ................. 385/147 |
| 2008/0089698 | A1* | 4/2008 | Jiang et al. .................. 398/189 |

FOREIGN PATENT DOCUMENTS

| | | |
|---|---|---|
| WO | 03067768 | 8/2003 |

OTHER PUBLICATIONS

Ozharar et al: "Time-division-multiplexing-based modulation scheme for RF chirp extension", Electronics Letters, vol. 42, No. 12, Jun. 8, 2006, pp. 1-2.*

Holman et al., Time-multiplexed optical waveform generation for high-resolution imaging Lasers and Electro-Optics, 2008, CLEO 2008, Conference on IEEE, Piscataway NJ, May 4, 2008, pp. 1-2.

Z. Jiang et al., "Spectral line-by-line pulse shaping" Optics Letters, vol. 30, No. 12, Jun. 15, 2005, pp. 1557-1559.

Gorju et al, "Active stabilization of a rapidly chirped laser by an optoelectronic digital servo-loop control" Optics Letters, vol. 32, No. 5, Mar. 1, 2007, pp. 484-486.

Washburn et al., "Fiber-laser-based frequency comb with a tunable repetition rate" Optics Express , vol. 12, No. 20, pp. 4999-5004, Oct. 4, 2004.

Aleksoff et al., "Synthetic aperture imaging with a pulsed CO2 TEA Laser" SPIE vol. 783, :Laser Radar II (1987), pp. 29-40.

Bashkansky et al., "Two-dimensional synthetic aperture imaging in the optical domain" Optics Letters, vol. 27, No. 22, Nov. 15, 2002, pp. 1983-1985.

Buell et al., "Demonstrations of Synthetic Aperture Imaging Ladar" Laser Radar Technology and Applications X, Proc. of SPIE, vol. 5791, pp. 152-166, Mar. 30-Apr. 1, 2005.

Burrows, "High Resolution Laser Lidar Utilizing Two-Section Distributed Feedback Semiconductor Laser as a Coherent Source" Electronics Letters, Apr. 26, 1990, vol. 26, No. 9, pp. 577-579.

Golubovic et al., "Optical frequency-domain reflectometry using rapid wavelength tuning of Cr4+ forsterite laser" Optics Letters, vol. 22, No. 22, Nov. 15, 1997, pp. 1704-1706.

Gschwendtner et al., "Development of Coherent Laser Radar at Lincoln Laborator" Lincoln Laboratory Journal, vol. 12, No. 2, 2000, pp. 383-396.

Iiyama et al., "Linearizing Optical Frequency-Sweep of a Laser Diode for FMCW Reflectometry" Journal of Lightwave Technology, vol. 14, No. 2, Feb. 1996, pp. 173-178.

Nakamura et al., "Optical Frequency Domain Ranging by a Frequency-Shifted Feedback Laser" IEEE Journal of Quantum Electronics vol. 36, No. 3, Mar. 2000, pp. 305-316.

Schneider et al., "Distance measurement of moving objects by frequency modulated laser radar" 2001 Society of Photo-Optical Instrumentation Engineers, pp. 33-37.

Tsuji et al., "Coherent Optical Frequency Domain Reflectometry for a Long Single-Mode Optical Fiber Using a Coherent Lightwave Source and an external Phase Modulator" IEEE photonics Technology Letters, vol. 7, No. 7, Jul. 1995, pp. 804-806.

Delfyett et al., "Optical Frequency Combs from Semiconductor Lasers and Applications in Ultrawideband Signal Processing and Communications" Journal of Lightwave Technology, vol. 24, No. 7, Jul. 2006, pp. 2701-2719.

Fontaine et al., "32 phase X 32 amplitude optical arbitrary waveform generation" Optics Letters, Apr. 1, 2007, vol. 32, No. 7, pp. 865-867.

Frumker et al., "Femtosecond pulse-shape modulation at nanosecond rates" Optics Letters vol. 30, No. 20, Oct. 15, 2005, pp. 2796-2798.

Jiang et al., "Optical arbitrary waveform processing of more than 100 spectral comb lines" Nature Photonics, vol. 1, Aug. 2007, pp. 463-467.

Jiang et al., "Spectral line-by-line pulse shaping" Optics Letters, vol. 30, No. 12, Jun. 15, 2005, pp. 1557-1559.

Jiang et al., "Optical Arbitrary Waveform Generation and Characterization Using Spectral Line-by-Line Control" Journal of Lightwave Technology, vol. 24, No. 7, Jul. 2006, pp. 2487-2494.

Jiang et al., "Line-by-line pulse shaping control for optical arbitrary waveform generation" Optics Express, vol. 13, No. 25., Dec. 12, 2005, pp. 10431-10439.

Kawanishi et al., "Fast optical frequency sweep for ultra-fine real-time spectral domain measurement" Electronics Letters, vol. 42, No. 17, 2 pages, Aug. 17, 2006.

Kurokawa et al., "Time-space-conversion optical signal processing using arrayed-waveguide grating" Electronics Letters, vol. 33, No. 22, Oct. 23, 1997, pp. 1890-1891.

Mandai et al.,"Repetition Rate and Center Wavelength—Tunable Optical Pulse Generation Using an Optical Comb Generator and a High-Resolution Arrayed-Waveguide Grating" IEEE Photonics Technology Letters, vol. 18, No. 5, Mar. 1, 2006, pp. 679-681.

Miyamoto et al., "Waveform-Controllable Optical Pulse Generation Using an Optical Pulse synthesizer" IEEE Photonics Technology Letters, vol. 18, No. 5, Mar. 1, 2006, pp. 721-723.

Ozharar et al., "Demonstration of Endless Phase Modulation for Arbitrary Waveform Generation" IEEE Photonics Technology Letters, vol. 17, No. 12, Dec. 2005, pp. 2739-2741.

Ozharar et al., "Frequency Skewed Optical Pulses for Range Detection" Proc. of SPIE vol. 6572, pp. 65720K-1-65720K-8, May 7, 2007.

Ozharar et al., "Time-division-multiplexing-based modulation scheme for RF chirp-extension" Electronic Letters, vol. 42, No. 12, Jun. 8, 2006, 2 pages.

Takiguchi et al., "Flexible pulse waveform generation using silica-waveguide-based spectrum synthesis circuit" Electronics Letters, vol. 40, No. 9, Apr. 29, 2004, 2 pages.

Tsuda et al., "Spectral encoding and decoding of 10 Gbit/s femtosecond pulses using high resolution arrayed-waveguide grating" Electronics Letters, vol. 35, No. 14, Jul. 8, 1999, pp. 1186-1188.

Wefers et al., "Generation of high-fidelity programmable ultrafast optical waveform" Optics Letters, vol. 20, No. 9, May 1, 1995, pp. 1047-1049.

Xia et al., "Arbitrary optical waveform generation using 2D ring resonator arrays" Optics Express, vol. 14, No. 15, Jul. 24, 2006, pp. 6619-6627.

Yilmaz et al., "Toward a Photonic Arbitrary Waveform Generator Using a Modelocked External Cavity Semiconductor Layer" IEEE Photonics Technology Letters, vol. 14, No. 11, Nov. 2002, pp. 1608-1610.

Adler et al., "Phase-sensitive optical coherence tomography at up to 370,000 lines per second using buffered Fourier domain mode-locked lasers" Optics Letters, vol. 32, No. 6, Mar. 15, 2007, pp. 626-628.

Huber et al., "Buffered Fourier domain mode locking unidirectional swept laser sources for optical coherence tomography imaging at 370,000 lines/s" Optics Letters, vol. 31, No. 20, Oct. 15, 2006, pp. 2975-2977.

Huber et al., "Fourier Domain Mode Locking (FDML): A new laser operating regime and applications for optical coherence tomography" Optics Express, vol. 14, No. 8, Apr. 17, 2006, pp. 3225-3237.

Lee et al., "External Line-Cavity Wavelength-Swept Source at 850 nm for Optical Coherence Tomograph" IEEE Photonics Technology Letters, vol. 19, No. 3, Feb. 1, 2007, pp. 176-178.

Srinivasan et al., "High-speed, high-resolution optical coherence tomography retinal imaging with a frequency-swept laser at 850nm" Optics Letters, vol. 32, No. 4, Feb. 15, 2007, pp. 361-363.

\* cited by examiner

TIME-MULTIPLEXED OPTICAL WAVEFORM GENERATION

This invention was made with government support awarded by the United States Air Force under Contract No. F19628-00-C-0002. The government has certain rights in the invention.

BACKGROUND OF THE INVENTION

The invention relates to the field of generating custom-designed optical waveforms, and in particular to manipulating the pulse train from a mode-locked laser to generate a custom optical waveform.

Previous implementations of broadband frequency chirps for high-resolution laser radar (lidar) have involved sweeping tunable CW laser sources, resulting in relatively slow chirps (1.5 THz in hundreds of ms) that have nonlinear contributions that must be measured and compensated. There has been recent interest in using the frequency components of a mode-locked laser to generate arbitrary optical waveforms. All of the previous works in this field have utilized architectures requiring high-speed control of the amplitude and phase of each component using the Fourier transform relationship to generate the waveform of interest. The only way to shift the frequency of one component is to apply a linear phase ramp on one of the phase modulators, referred to as serrodyning. However, a phase modulator cannot be driven to an arbitrary phase, and so implementations of this strategy have required multiple waveform generators interleaved together to simulate a continuous linear phase ramp. These systems have only provided frequency offsets of 1 MHz.

SUMMARY OF THE INVENTION

According to one aspect of the invention, there is provided a time-multiplexed waveform generator. The time-multiplexed waveform generator includes a wavelength splitter that receives an input optical signal and spectrally separates the input optical signal into a plurality of frequency components. A plurality of intensity modulators receives each of the frequency components and passes each of the frequency components for a selective time period, and then extinguishes that frequency for the remainder of a chirp time, the plurality of intensity modulators producing a plurality of first output signals. A plurality of adjustable delay lines is positioned after the intensity modulators and receives the first output signals. Each of the adjustable delay lines enables phase control of each of the frequency components associated with the first output signals for compensating any relative drifts of the path lengths and phase coherently stitching a plurality of sub-chirps together. The adjustable delay lines produce a plurality of second output signals. A wavelength combiner receives the second output signals and recombines the output signals to produce a stair-step waveform output signal.

According to another aspect of the invention, there is provided a method of performing time-multiplexed waveform generation. The method includes receiving an input optical signal and spectrally separating the input optical signal into a plurality of frequency components. Also, the method includes passing each of the frequency components for a selective time period, and then extinguishing that frequency for the remainder of a chirp time, a plurality of first output signals being produced. Moreover, the method includes enabling phase control of each of the frequency components associated with the first output signals for compensating any relative drifts of the path lengths and phase coherently stitching a plurality of sub-chirps together, a plurality of second output signals being produced. Furthermore, the method includes recombining the second output signals to produce a stair-step waveform output signal.

DETAILED DESCRIPTION OF THE INVENTION

The invention involves a novel technique for manipulating the pulse train from a mode-locked laser to generate a custom optical waveform. Specifically, the invention is a technique to produce a broadband linear optical frequency ramp that covers 1.5 THz chirp in 75 µs.

Figure 1:
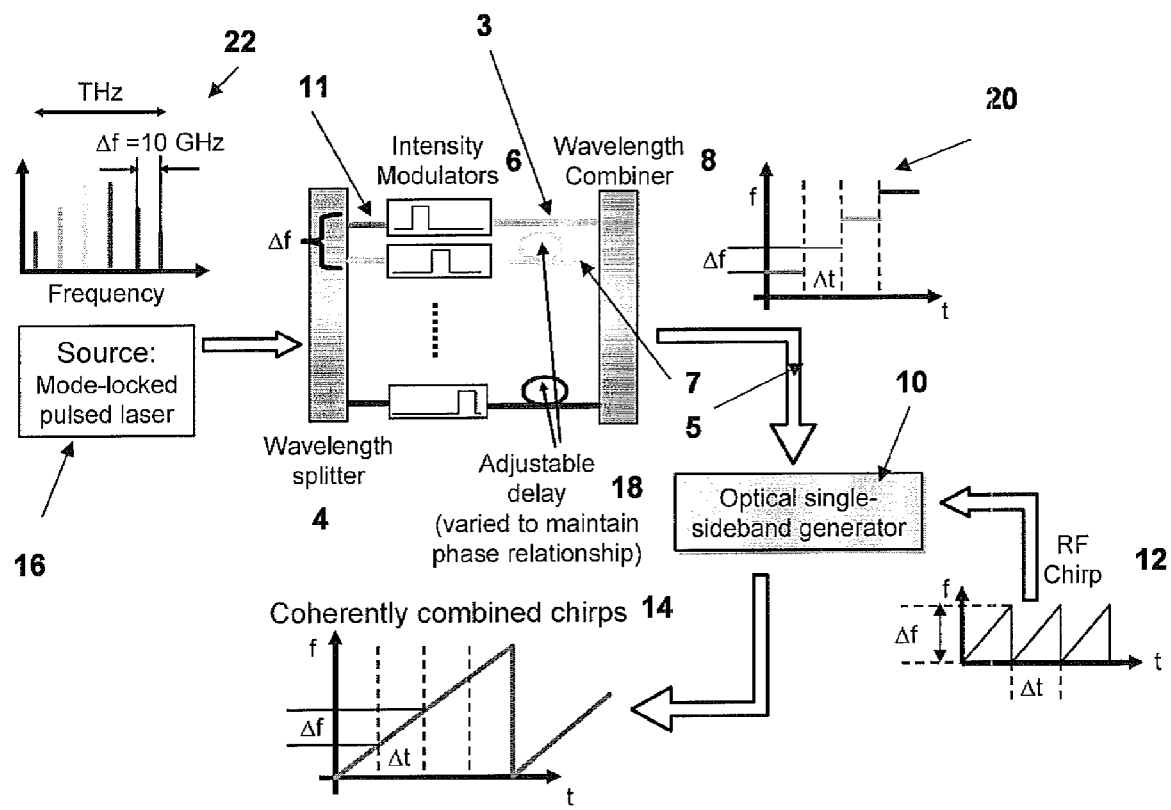
FIG. 1 is a schematic diagram illustrating the inventive time-multiplexed optical waveform generator.

The invention uses the discrete frequency lines of the frequency comb produced by a mode-locked laser 16 to generate many sub-chirps that are sequentially combined phase-coherently to construct a single broadband linear frequency ramp, as shown in FIG. 1. The comb components 11 are first spectrally separated by wavelength splitter 4 so each is transmitted along a separate optical path. Each frequency then passes through an electro-optic intensity modulator 6, which passes each frequency for 0.5 µs, and then extinguishes that frequency for the remainder of the chirp time in an output signal 3. The timing of the modulators 6 is adjusted so that recombination of the frequencies produces a stair-step waveform of frequency vs. time, as shown in graph 20. The step size is given by the mode spacing of the original frequency comb, or equivalently by the repetition frequency of the mode-locked laser 16, which is 10 GHz as shown in graph 22. However, in other embodiments the repetition frequency can vary.

Adjustable delay lines 18 immediately are positioned and receive output signals 3 after each of the modulators 6 and enable phase control of the frequencies for compensating any relative drifts of the path lengths and phase coherently stitching the sub-chirps together, which will be described further below. The output signals 7 of each of the intensity modulators 6 are recombined by the wavelength combiner 8, producing a stair-step waveform 5 that is transmitted through an optical single sideband modulator 10 driven with a repetitive RF chirped waveform 12. Each period of the RF waveform is a 0.5-µs linear frequency ramp extending from 5-15 GHz. This sequentially introduces a sideband on each of the optical frequencies (the carrier is nulled) that sweeps 10 GHz and matches up with the beginning of the sweep of the next optical frequency's sideband. The adjustable delay lines 18 in the individual optical paths immediately after the intensity modulators 6 are used to set the beginning phases of each of the sub-chirps such that a continuous, phase-coherent broadband chirp is generated extending over N×10 GHz in N×0.5 µs, where N is the number of frequency channels. In other embodiments, the duration and center-frequency of the RF chirp can vary, as can its extent to match the repetition frequency of the mode-locked laser 16.

Since a mode-locked laser serves as the source of the optical frequencies, there is very little high-frequency relative phase noise among the frequency components. The dominant source of relative noise that must be cancelled by the delay line in each path is due to differential path length fluctuations occurring when each frequency is traveling on a separate path. It has been demonstrated that the phase-coherent stitching of two sub-chirps produces a 20-GHz frequency ramp.

In the previous works on optical waveform generation using a mode-locked laser, to avoid the limitation of having the repetition period of the generated waveform equal to that of the mode-locked laser, N amplitude and N phase modulators are required that all have a bandwidth equal to that of the laser repetition frequency (10 GHz), where N frequency components are used. In contrast, the inventive arrangement 2 uses a time-multiplexed approach to transmit each frequency component sequentially in time or a time-multiplexed fashion through the same high-speed modulator 10, which is a single-sideband modulator. With this approach, the intensity modulators 6 and adjustable delay lines 18 acting on each component can have a very low bandwidth as compared to the comb spacing, and only one large-bandwidth modulator 10 is required regardless of the number of frequency components used. This results in a much simpler, robust, cost-effective system.

For the stitching of two sub-chirps, there are two techniques for measuring the stitching phase error. This measurement is necessary to apply a correction signal to the adjustable delay line in the path of one of the optical frequencies. The first technique, illustrated in FIG. 2A-2B, takes advantage of the polarization dependence of the extinction ratio of the electro-optic intensity modulators. This allows direct measurement of the relative phase fluctuation.

Figures 2A, 2B, 2C:
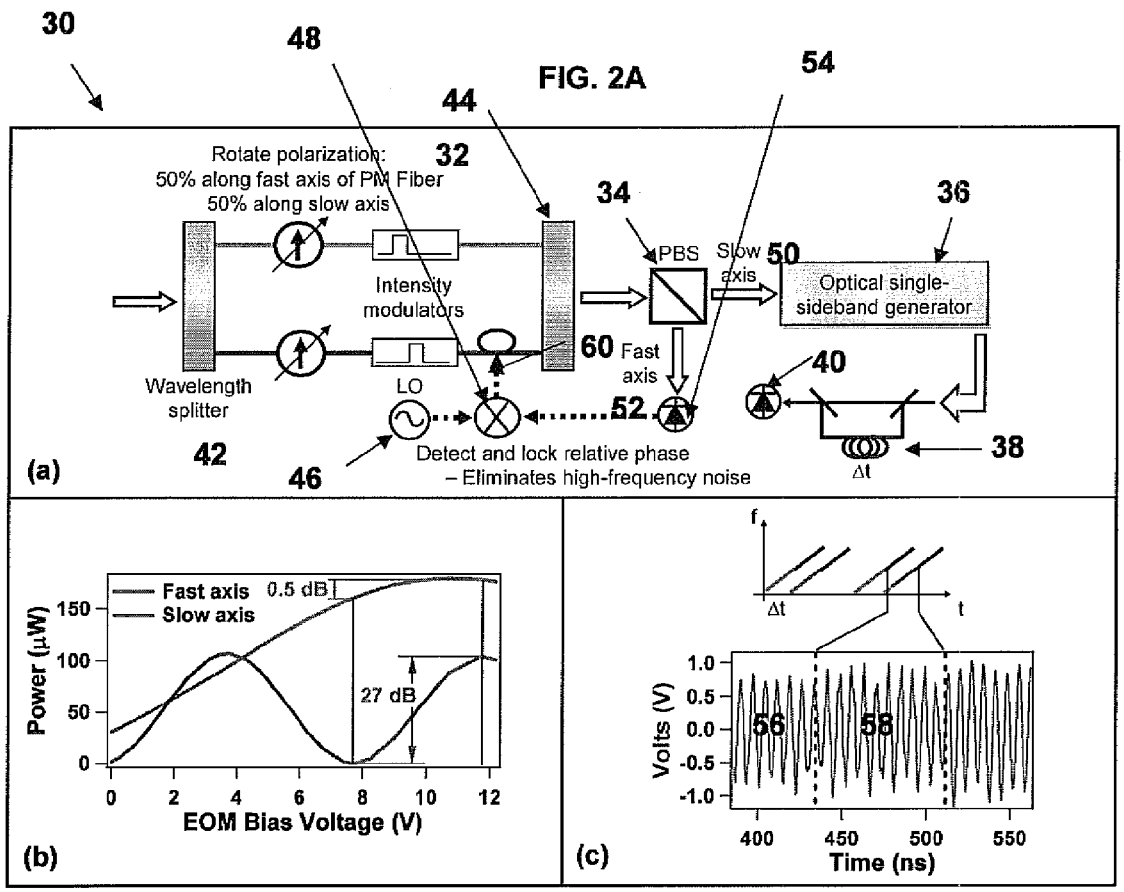
FIG. 2 is a schematic diagram illustrating an embodiment used in stitching of two sub-chirps.

In particular, FIG. 2A shows a time multiplexed optical waveform generator 2 having a wavelength splitter 4 that produces frequency comb components so each is transmitted along a separate optical path. Each frequency then passes through a polarization rotator 32 and electro-optic intensity modulator 6, which passes each frequency for 0.5 µs, and then extinguishes that frequency for the remainder of the chirp time. The timing of the modulators 6 is adjusted so that recombination of the frequencies produced by the wavelength combiner 44 is a stair-step waveform of frequency vs. time. The step size is given by the mode spacing of the original frequency comb, or equivalently by the repetition frequency of the mode-locked laser, which is 10 GHz in this embodiment.

After recombining the two optical frequencies, a polarizing beamsplitter 34 is used to separate the fast-axis 52 and slow-axis 50 polarizations, shown in FIG. 2A. The slow-axis 50 light yields the desired stair-step waveform, where there is no temporal overlap of the two frequencies, and this subsequently passes to the optical single sideband modulator 36 for chirping, thus generating the chirped waveform 14.

The fast-axis 52 light is directed to a photodetector 54, which produces the 10-GHz beat signal between the two frequencies and allows direct measurement of the relative phase fluctuations between these two frequencies using an RF mixer 48. The adjustable delay line 18 uses the output signal of the mixer 48 to stabilize the phase of the beat signal to that of a stable RF synthesizer 46 providing a phase-continuous chirp.

FIG. 2B shows that the light 50 polarized along the slow-axis of the PM fiber in the system experiences 27 dB attenuation, while the fast-axis 52 light experiences only 0.5 dB attenuation. The light polarization is adjusted prior to the intensity modulators 6 to produce components polarized along both the fast 52 and slow 50 axes of the PM fiber.

The second method for measuring the phase stitching error involves directly monitoring the generated chirp. This is implemented by detecting the heterodyne beat signal between the chirped waveform and a delayed copy of itself with a photodetector 40, using a fiber delay line 38 to set up an interferometer with mismatched arm lengths immediately after the optical single sideband modulator 36. This interferometer causes the optical chirped waveform to combine with a delayed copy of itself. FIG. 2C shows an example of this beat signal. The phase of the beat occurring in the overlap region 58, where the end of the first optical sub-chirp beats with the beginning of the second optical sub-chirp, is sensitive to this relative optical phase, whereas the phase in the portions where each sub-chirp is beating with a delayed copy of itself is not sensitive to this relative optical phase. By measuring the phase discontinuity between the region 56 where the first sub-chirp is beating with itself and this overlap region 58, the relative optical phase is determined. This technique has been used in conjunction with the first technique to enhance the stabilization.

The first technique is used to achieve high bandwidth feedback (~1 kHz), and the second technique is used to provide information for slowly adjusting the phase of the reference synthesizer used in the first method to eliminate the effect of any slowly changing birefringence of the fiber. Alternatively, one can use the second technique alone to directly control the adjustable delay lines 18 and produce a phase-coherent chirp. Although the bandwidth of the feedback is not as great (~200 Hz), it is sufficient to provide adequate phase stitching. For higher numbers of sub-chirps, the first technique will not work and it is necessary to rely on the second technique. Using either technique, the stitching of 2 sub-chirps produce a 20-GHz optical frequency ramp in 1 µs that yields a point spread function for range measurements in a high-resolution lidar application that exhibits −20 dB power sidelobes.

There are a number of applications of this technology for generating custom-designed optical waveforms using mode-locked lasers. A 1.5-THz frequency ramp generated in <100 µs would provide a range resolution of 100 µm in an LFM lidar system. This would enable a number of standoff biometric applications, including 3D facial imaging and iris recognition. In addition, waveform construction using the modes of a mode-locked laser could be more generally applied to the generation of waveforms for a number of purposes, including coherent control of light-matter interactions for enhancing signals during spectroscopic analysis of unknown substances.

Other applications include waveform engineering for advanced optical communications and the generation of linear broadband chirps for optical coherence tomography (OCT). OCT is of great interest to the biomedical field because of its ability to provide high-resolution sub-surface imaging of biological tissues using non-invasive means. The bandwidth of the frequency ramp is important in OCT applications to provide high resolution, and the speed with which our technique can produce a broadband ramp is beneficial for OCT to eliminate blurring caused by motion of the object to be imaged during the frequency sweep. The excellent linearity of the chirps that the technique enables relaxes the constraint on matching the lengths of the reference arm and sample arm, allowing a higher dynamic range of imaging.

Although the present invention has been shown and described with respect to several preferred embodiments thereof, various changes, omissions and additions to the form and detail thereof, may be made therein, without departing from the spirit and scope of the invention.

What is claimed is:

1. A time-multiplexed optical waveform generator comprising:
    a wavelength splitter that receives an input optical signal and spectrally separates said input optical signal into a plurality of frequency components, said input optical signal being produced by a mode-locked laser;

a plurality of intensity modulators receiving each of said frequency components and passing each of said frequency components for a selective time period, and then extinguishing that frequency for the remainder of a chirp time, said plurality of intensity modulators producing a plurality of first output signals;

a plurality of adjustable delay lines that are positioned after each of the intensity modulators and receive said first output signals, each of said adjustable delay lines enabling phase control of each of said frequency components associated with said first output signals for compensating any relative drifts of the path lengths and phase coherently stitching a plurality of sub-chirps together, said adjustable delay lines producing a plurality of second output signals; and a wavelength combiner receiving said second output signals and recombining said output signals to produce a stair-step waveform output signal; and an optical single sideband modulator receiving said stair-step waveform output signal and sequentially introducing a sideband on each of the frequency components that sweeps a selective frequency range and matches up with the beginning of the sweep of the next optical frequency's sideband, said optical single sideband modulator being driven with a repetitive RF chirped waveform comprising a linear frequency ramp with a span equal to the repetition frequency of said mode-locked laser.

2. The time-multiplexed optical waveform generator of claim 1 further comprising a polarization rotator for each of said frequency components immediately before each of said intensity modulators, causing the light polarization to be adjusted to produce components polarized along both the fast and slow axes of said intensity modulators.

3. The time-multiplexed optical waveform generator of claim 2 further comprising a polarizing beamsplitter used to separate said fast-axis and slow-axis polarizations associated with said stair-step waveform output signal.

4. The time-multiplexed optical waveform generator of claim 3, wherein said fast-axis polarization is directed to a photodetector producing a beat signal between two frequencies, allowing direct measurement of the relative phase fluctuations between these two frequencies using an RF mixer.

5. The time-multiplexed optical waveform generator of claim 4, wherein said adjustable delay lines are used to stabilize the phase of said beat signal to that of a stable RF synthesizer, thus setting the beginning phase of each of the sub-chirps to provide a phase-continuous broadband chirp.

6. The time-multiplexed optical waveform generator of claim 1 further comprising an interferometer with mis-matched arm lengths immediately after said optical single sideband modulator, causing the optical chirped waveform to combine with a delayed copy of itself.

7. The time-multiplexed optical waveform generator of claim 6, wherein said optical chirped waveform and said delayed copy are directed to a photodetector that produces a beat signal, allowing direct measurement of the relative phases between said sub-chirps comprising said optical chirped waveform.

8. The time-multiplexed optical waveform generator of claim 7, wherein said beat signal generated from said optical chirped waveform and said delayed copy is digitized and demodulated to extract the phase evolution of the beat signal, allowing direct measurement of the relative phases of said sub-chirps comprising said optical chirped waveform.

9. The time-multiplexed optical waveform generator of claim 8, wherein said adjustable delay lines are used to maintain phase continuity of the beat signal generated from said optical chirped waveform and said delayed copy throughout the duration of the chirp, providing a phase-continuous chirp.

10. A method of performing time-multiplexed optical waveform generation comprising:

receiving an input optical signal and spectrally separating said input optical signal into a plurality of frequency components, said input optical signal being produced by a mode-locked laser;

passing each of said frequency components for a selective time period, and then extinguishing that frequency for the remainder of a chirp time, a plurality of first output signals being produced;

enabling phase control of each of said frequency components associated with said first output signals for compensating any relative drifts of the path lengths and phase coherently stitching a plurality of sub-chirps together, a plurality of second output signals being produced;

recombining said second output signals to produce a stair-step waveform output signal; and receiving said stair-step waveform output signal and sequentially introducing a sideband on each of the frequency components that sweeps a selective frequency range and matches up with the beginning of the sweep of the next optical frequency's sideband, said sequential introduction of a sideband that sweeps a selective frequency range requiring a repetitive RF chirped waveform comprising a linear frequency ramp with a span equal to the repetition frequency of said mode-locked laser.

11. The method of claim 10 further comprising providing a polarization rotator for each of said frequency components to produce two orthogonal polarization components, where one is selectively passed and generates said stair-step waveform output signal, while the other is unaffected by the method for passing each frequency component for a selective time period.

12. The method of claim 11 further comprising providing a polarizing beamsplitter used to separate the fast-axis and slow-axis polarizations, the latter associated with said stair-step waveform output signal.

13. The method of claim 12, wherein said fast-axis polarization is directed to a photodetector producing a beat signal between two frequencies, allowing direct measurement of the relative phase fluctuations between these two frequencies using an RF mixer.

14. The method of claim 13, wherein said phase control of each of said frequency components enables stabilizing the phase of said beat signal to that of a stable RF synthesizer, thus setting the beginning phase of each of the sub-chirps to provide a phase-continuous broadband chirp.

15. The method of claim 10 further comprising providing an interferometer with mis-matched arm lengths immediately after said sequential introduction of a swept sideband on said frequency components, causing the optical chirped waveform to combine with a delayed copy of itself.

16. The method of claim 15, wherein said optical chirped waveform and said delayed copy are directed to a photodetector that produces a beat signal, allowing direct measurement of the relative phases between said sub-chirps comprising said optical chirped waveform.

17. The method of claim 16, wherein said beat signal generated from said optical chirped waveform and said delayed copy is digitized and demodulated to extract the phase evolution of the beat signal, allowing direct measurement of the relative phases of said sub-chirps comprising said optical chirped waveform.

18. The method of claim 17, wherein said phase control of each of said frequency components enables maintaining the phase continuity of the beat signal generated from said optical chirped waveform and said delayed copy throughout the duration of the chirp, providing a phase-continuous chirp.

* * * * *